(12) United States Patent
Marchlewski et al.

(10) Patent No.: US 12,179,846 B2
(45) Date of Patent: Dec. 31, 2024

(54) CARGO BED EXTENSION SYSTEM

(71) Applicant: Ford Global Technologies, LLC, Dearborn, MI (US)

(72) Inventors: Jack Marchlewski, Saline, MI (US); Vincent Anthony Chimento, Plymouth, MI (US); Shawn Michael Morgans, Chelsea, MI (US); Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 17/740,464

(22) Filed: May 10, 2022

(65) Prior Publication Data

US 2023/0365199 A1 Nov. 16, 2023

(51) Int. Cl.
*B62D 33/027* (2006.01)
*B62D 33/03* (2006.01)
*B62D 33/08* (2006.01)

(52) U.S. Cl.
CPC ......... *B62D 33/0273* (2013.01); *B62D 33/03* (2013.01); *B62D 33/08* (2013.01)

(58) Field of Classification Search
CPC ........... B60R 5/041; B60P 3/40; B62D 33/02; B62D 33/0273; B62D 33/03; B62D 33/08
See application file for complete search history.

(56) References Cited

U.S. PATENT DOCUMENTS

| | | | | |
|---|---|---|---|---|
| 4,909,558 A * | 3/1990 | Roshinsky | .............. | B60R 13/01 296/37.6 |
| 5,456,511 A * | 10/1995 | Webber | ..................... | B60P 1/00 296/57.1 |
| 5,564,767 A * | 10/1996 | Strepek | ..................... | B60P 1/00 312/334.47 |
| 5,649,731 A * | 7/1997 | Tognetti | .................. | B60P 1/003 296/57.1 |
| 5,816,637 A * | 10/1998 | Adams | ....................... | B60P 3/40 296/57.1 |
| 7,543,873 B1 * | 6/2009 | Thornsberry | ........... | B60P 1/003 224/403 |
| 7,967,356 B2 * | 6/2011 | Stackpole | ........... | B62D 33/0273 296/26.08 |
| 9,789,800 B2 | 10/2017 | Thygesen | | |
| 10,124,836 B2 * | 11/2018 | Singer | .................... | B62D 33/08 |
| 10,472,003 B2 | 11/2019 | Karumuri et al. | | |
| 11,059,423 B1 * | 7/2021 | Weaver | ................. | B62D 33/027 |
| 11,753,086 B2 * | 9/2023 | Harmon | .................. | B60P 7/135 296/26.11 |
| 11,772,714 B2 * | 10/2023 | Harmon | .............. | B62D 33/0273 296/183.1 |

(Continued)

*Primary Examiner* — Gregory A Blankenship
(74) *Attorney, Agent, or Firm* — Vichit Chea; Carlson, Gaskey & Olds, P.C.

(57) ABSTRACT

A cargo bed extension system includes a tub of a cargo bed. The tub is configured to transition back-and-forth between a standard position and an extended position. The tub is closer to a cab of a vehicle when the tub is in the standard position than when the tub is in the extended position. A panel is oriented vertically when the tub is in the standard position and is oriented horizontally when the tub is in the extended position. The panel provides a floor section between the cab and the tub when the tub is in the extended position.

14 Claims, 5 Drawing Sheets

(56) References Cited

U.S. PATENT DOCUMENTS

| | | | |
|---|---|---|---|
| 2003/0141733 A1* | 7/2003 | Burg | B60R 5/041 |
| | | | 296/26.09 |
| 2009/0284036 A1* | 11/2009 | Clayton | B60P 3/40 |
| | | | 296/26.09 |
| 2010/0026027 A1 | 2/2010 | Gao | |
| 2018/0057076 A1* | 3/2018 | Singer | B62D 33/0273 |
| 2021/0188368 A1* | 6/2021 | Williams | B60P 3/40 |
| 2023/0256891 A1* | 8/2023 | Harmon | B60R 11/06 |
| | | | 296/26.08 |
| 2023/0257031 A1* | 8/2023 | Harmon | B62D 33/08 |
| 2023/0257034 A1* | 8/2023 | Harmon | B62D 33/08 |
| | | | 296/26.09 |
| 2023/0365199 A1* | 11/2023 | Marchlewski | B62D 33/027 |

\* cited by examiner

CARGO BED EXTENSION SYSTEM

TECHNICAL FIELD

This disclosure relates generally to a cargo bed of a vehicle and, more particularly, to a cargo bed that can be extended.

BACKGROUND

Some vehicles, such as pickup trucks, include a cargo bed. Users utilize cargo beds to carry various types of cargo. The cargo bed can be located behind a cab of the vehicle. A tailgate can enclose an aft end of the cargo bed.

SUMMARY

In some aspects, the techniques described herein relate to a cargo bed extension system, including: a tub of a cargo bed, the tub configured to transition back-and-forth between a standard position and an extended position, the tub closer to a cab of a vehicle when the tub is in the standard position than when the tub is in the extended position; and a panel that is oriented vertically when the tub is in the standard position and is oriented horizontally when the tub is in the extended position, the panel providing a floor section between the cab and the tub when the tub is in the extended position.

In some aspects, the techniques described herein relate to a cargo bed extension system, wherein the panel faces rearward when the tub is in the standard position, wherein the panel faces upward when the tub is in the extended position.

In some aspects, the techniques described herein relate to a cargo bed extension system, wherein the panel is pivotably coupled to a forward end of the tub.

In some aspects, the techniques described herein relate to a cargo bed extension system, further including a tailgate pivotably coupled to an aft end of the tub, the tailgate moving with the tub between the standard position and the extended position.

In some aspects, the techniques described herein relate to a cargo bed extension system, wherein the tub includes a tub floor, a first tub sidewall, and a second tub sidewall, the first and second tub sidewalls extending vertically upward from opposite sides of the tub floor.

In some aspects, the techniques described herein relate to a cargo bed extension system, further including a driver side upper rail assembly and a passenger side upper rail assembly, the first tub sidewall including a lip coupled to the driver side upper rail assembly, the second tub sidewall including a lip coupled to the passenger side upper rail assembly.

In some aspects, the techniques described herein relate to a cargo bed extension system, wherein the lip of the first tub sidewall and the lip of the second tub sidewall each extend laterally outward away from a centerline of the vehicle.

In some aspects, the techniques described herein relate to a cargo bed extension system, wherein the tub is an inner tub, and further including an outer tub having an outer tub floor, an outer tub passenger sidewall, and an outer tub driver sidewall, wherein the inner tub is nested within the outer tub.

In some aspects, the techniques described herein relate to a cargo bed extension system, wherein the driver side upper rail assembly slidably couples the lip of the first tub sidewall to the outer tub driver sidewall, wherein the passenger side upper rail assembly slidably couples the lip of the second tub sidewall to the outer tub passenger sidewall.

In some aspects, the techniques described herein relate to a cargo bed extension system, wherein the driver side upper rail assembly is disposed vertically between the lip of the first tub sidewall and a ledge of the outer tub driver sidewall, wherein the passenger side upper rail assembly is disposed vertically between the lip of the second tub sidewall and a ledge of the outer tub passenger sidewall.

In some aspects, the techniques described herein relate to a cargo bed extension system, further including at least one lower rail assembly that couples the tub floor of the inner tub to the outer tub floor of the outer tub.

In some aspects, the techniques described herein relate to a cargo bed extension system, including: an outer tub having a pair of opposing outer tub sidewalls extending upward from opposite sides of an outer tub floor; and an inner tub nested within the outer tub, the inner tub having a pair of opposing inner tub sidewalls extending upward from opposite sides of an inner tub floor, the inner tub slidably coupled to the outer tub and configured to transition back-and-forth between a standard position and an extended position relative to the outer tub, the inner tub in the extended position providing an extended cargo bed for a vehicle.

In some aspects, the techniques described herein relate to a cargo bed extension system, further including a plurality of rail assemblies that slidably couple the inner tub to the outer tub.

In some aspects, the techniques described herein relate to a cargo bed extension system, further including a panel that is oriented vertically when the inner tub is in the standard position, and is oriented horizontally when the inner tub is in the extended position to provide a floor section between a cab of the vehicle and the inner tub floor.

In some aspects, the techniques described herein relate to a cargo bed extension system, wherein the panel is pivotably coupled to a forward side of the inner tub floor.

In some aspects, the techniques described herein relate to a cargo bed extension system, further including a tailgate pivotably coupled to an aft end of the inner tub floor.

In some aspects, the techniques described herein relate to a cargo bed extension method, including: extending an inner tub relative to an outer tub to extend a cargo bed of a vehicle, the inner tub nested within the outer tub, the inner tub including inner tub sidewalls that are slidably coupled to outer tub sidewalls of the outer tub.

In some aspects, the techniques described herein relate to a cargo bed extension method, further including lowering a panel to provide a floor section between a floor of the inner tub and a cab of the vehicle.

In some aspects, the techniques described herein relate to a cargo bed extension method, wherein the lowering is during the extending.

In some aspects, the techniques described herein relate to a cargo bed extension method, wherein the panel is pivotably coupled to the inner tub.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a vehicle having a cargo bed that can be extended. A cargo bed extension system for the vehicle includes an inner tub nested within an outer tub. The inner tub can be extended rearward away from a cab of the vehicle when the cargo bed is extended.

Figure 1:
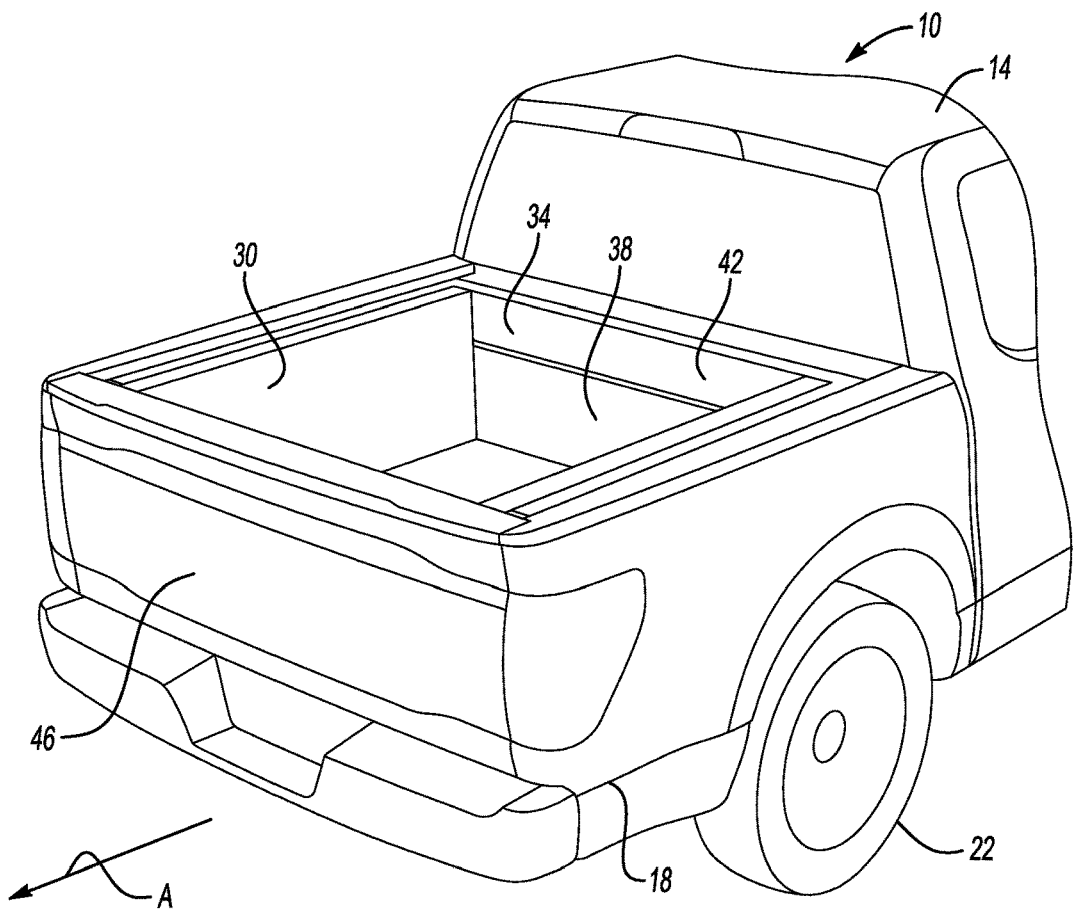
FIG. 1 illustrates a vehicle having a cargo bed in a standard bed position according to an exemplary embodiment of the present disclosure.
Figure 2:
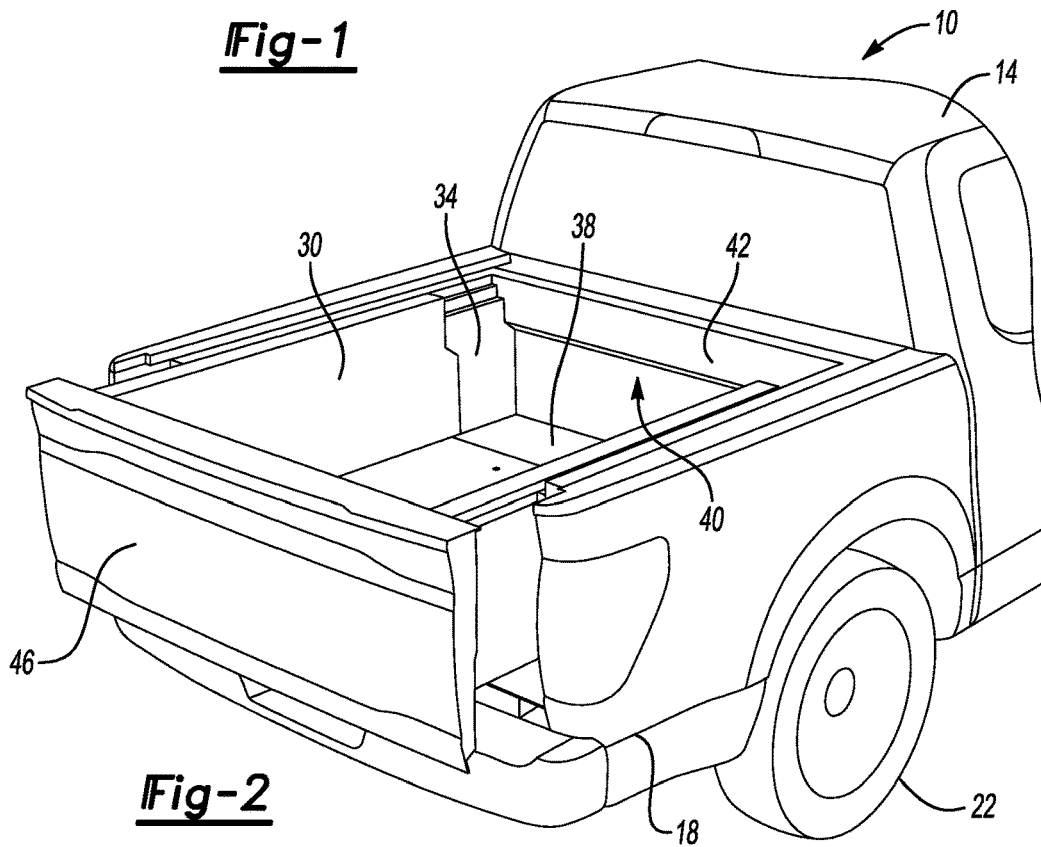
FIG. 2 illustrates the cargo bed of FIG. 1 transitioned to an extended bed position with a tailgate in a closed position.
Figure 3:
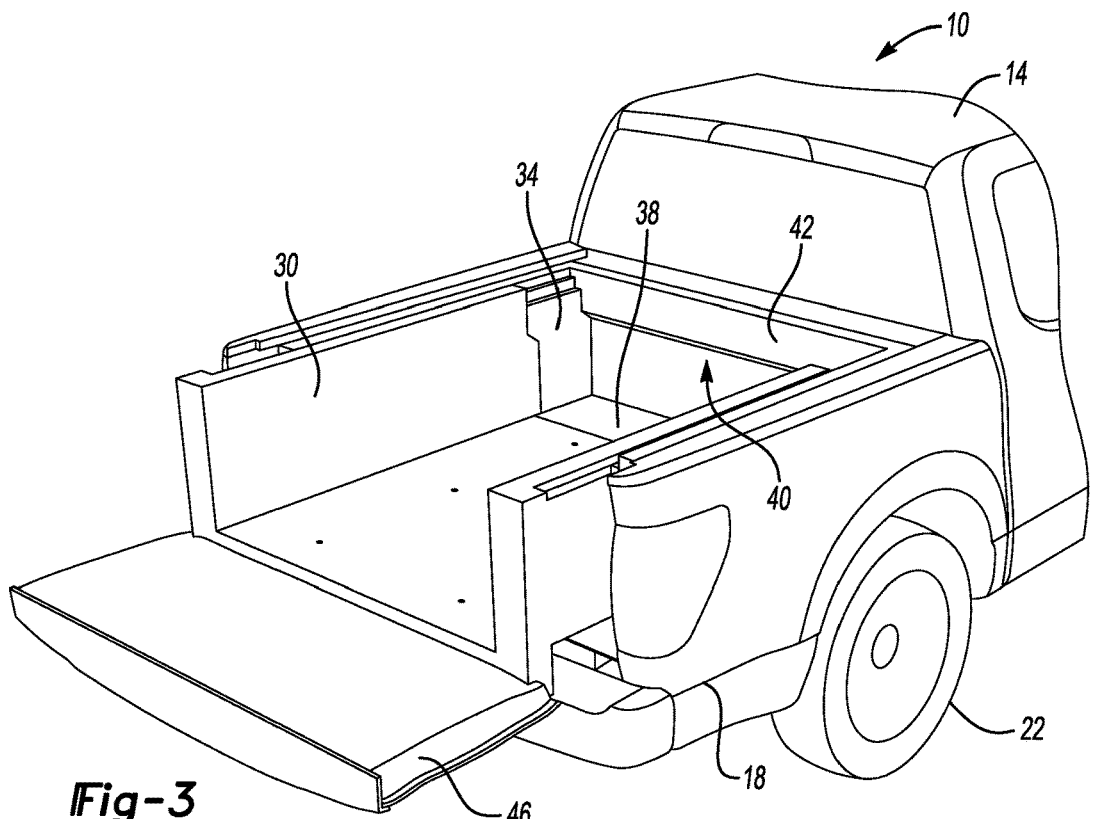
FIG. 3 illustrates the cargo bed of FIG. 1 in the extended bed position with the tailgate in an open position.
Figure 4:
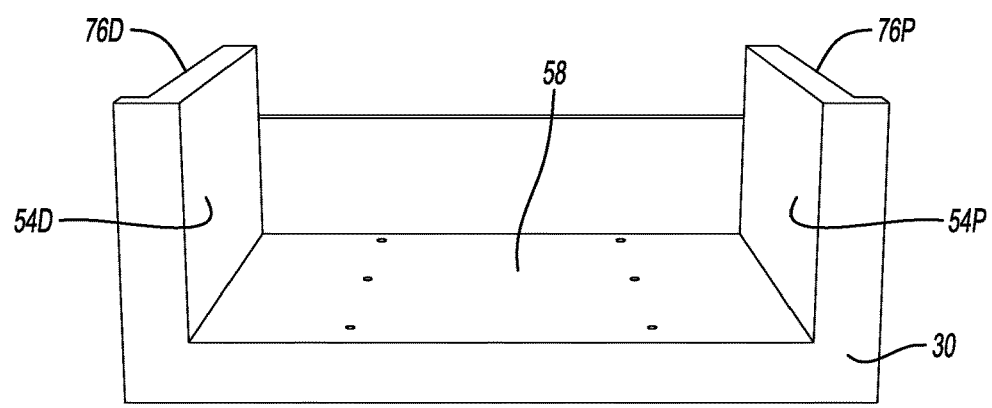
FIG. 4 illustrates an expanded view of a cargo bed extension system from the vehicle of FIG. 1.
Figure 4:
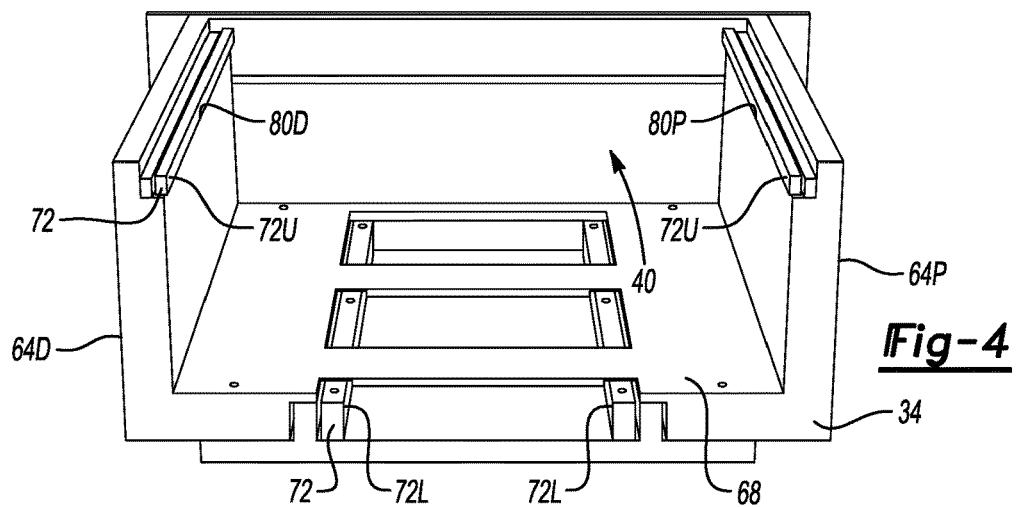
Figure 5:
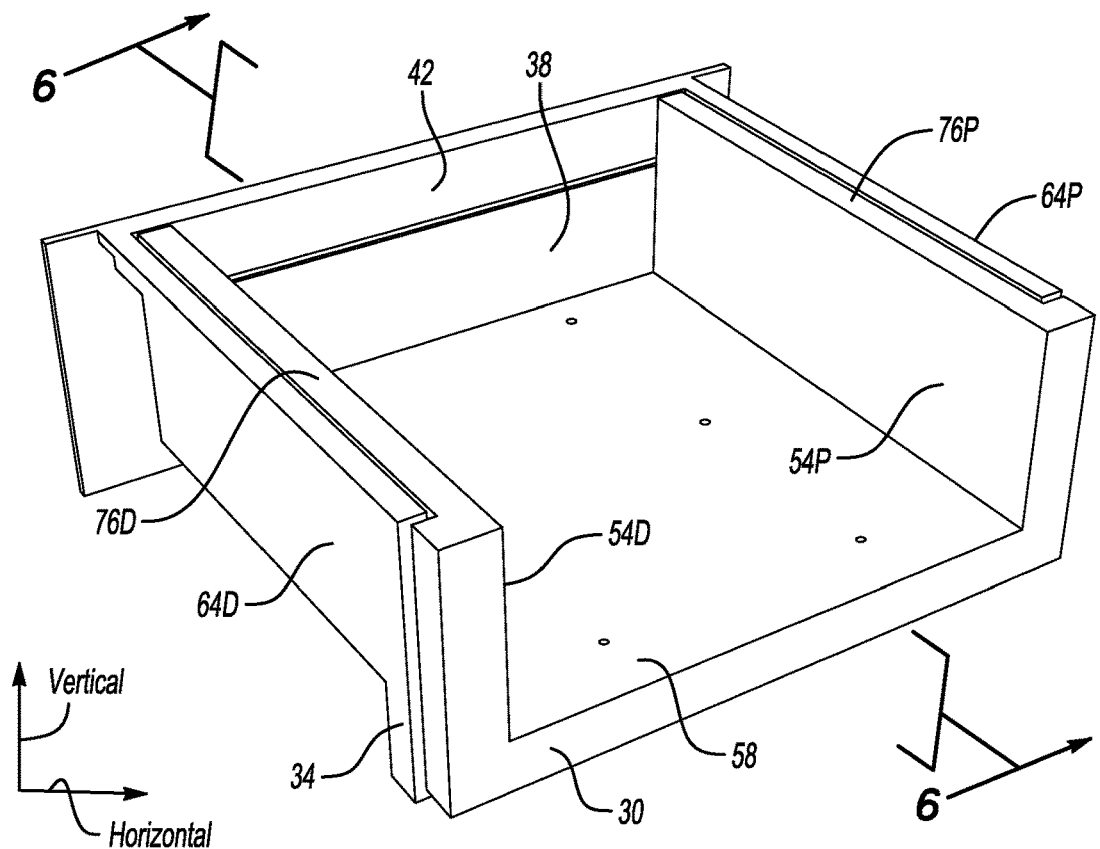
FIG. 5 illustrates the system of FIG. 4 when an inner tub is in a standard position and a panel is oriented vertically.
Figure 6:
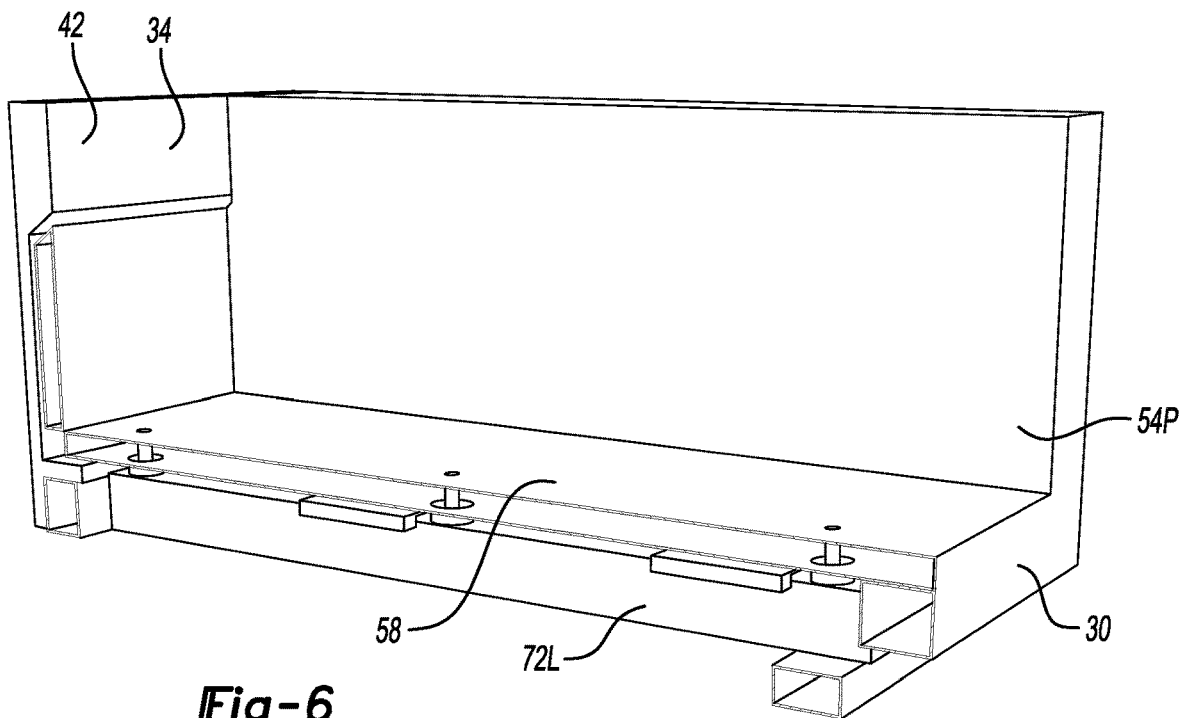
FIG. 6 illustrates a section view at line 6-6 in FIG. 5.
Figure 7:
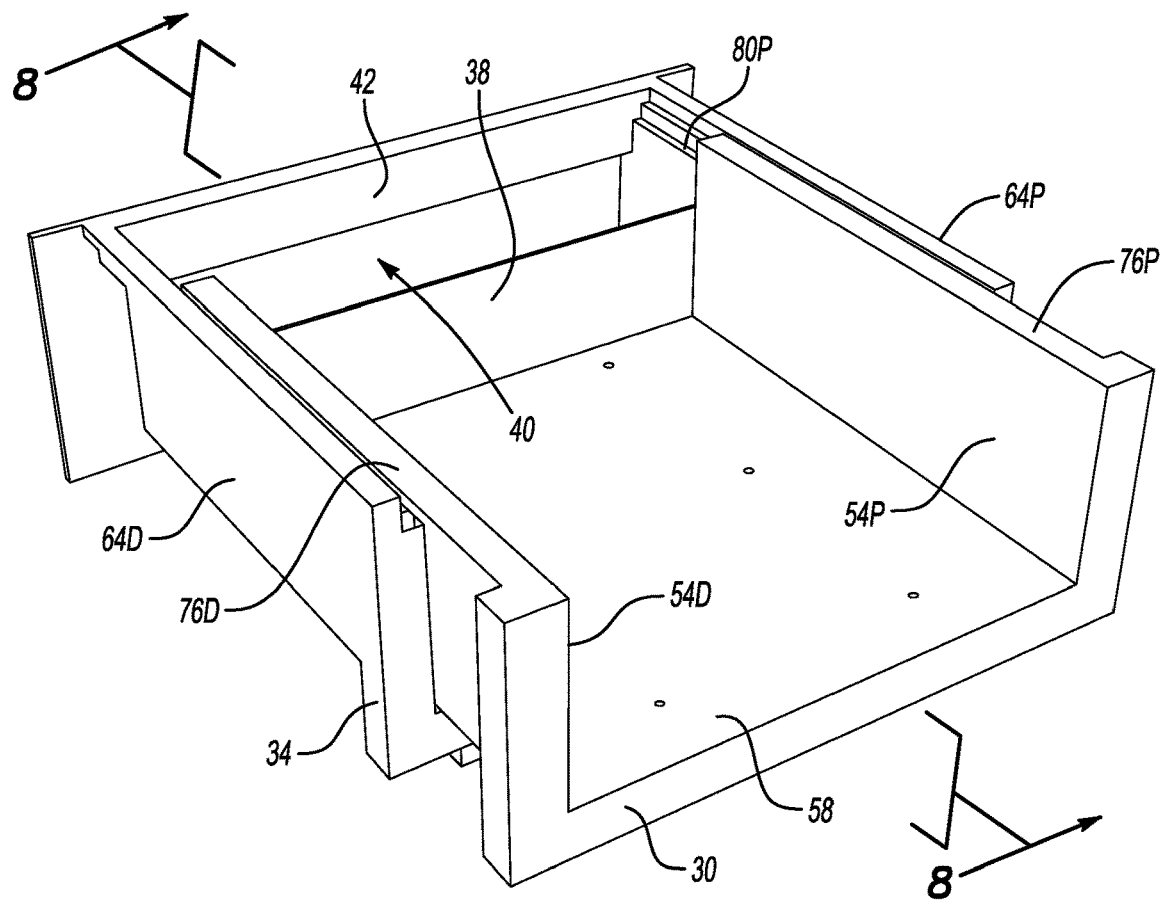
FIG. 7 illustrates the system of FIG. 4 when the inner tub is in an extended position and the panel is oriented vertically.
Figure 8:
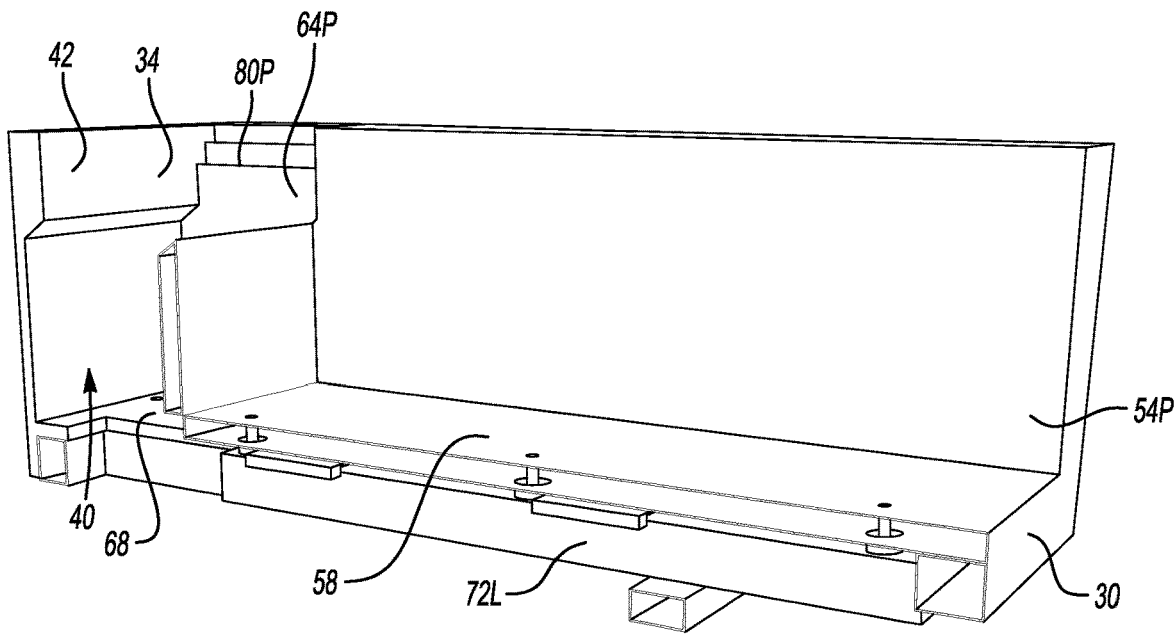
FIG. 8 illustrates a section view at line 8-8 in FIG. 7.

With reference to FIGS. 1-3, a vehicle 10 includes a cab 14 and a cargo bed 18 that is aft the cab 14 along a longitudinal axis A of the vehicle 10.

In the exemplary embodiment, the vehicle 10 is a pickup truck. The vehicle 10 could be another type of vehicle in another example, such as a car, van, sport utility vehicle, etc.

The example vehicle 10 is an electrified vehicle and, in particular, a battery electric vehicle. In another, example, the vehicle 10 could be another type of vehicle, such as a plug-in hybrid electric vehicle (PHEV), or a conventional vehicle.

The example vehicle 10 includes an electrified powertrain capable of applying torque from an electric machine (e.g., an electric motor) to drive one or more drive wheels 22. The vehicle 10 can include a traction battery pack that powers the electric machine and, potentially other electrical loads of the vehicle 10. The powertrain of the vehicle 10 may electrically propel the drive wheels 22 either with or without the assistance of an internal combustion engine.

FIG. 1 shows the cargo bed 18 in a standard bed position. FIGS. 2 and 3 show the cargo bed 18 in an extended bed position. The cargo bed 18 can be transitioned back-and-forth to the standard bed position from the extended bed position.

In the extended bed position, the cargo bed 18 can be utilized to transport more cargo (or larger cargo) than what can be transported when the cargo bed 18 is in the standard bed position of FIG. 1.

With reference now to FIGS. 4-10 and continued reference to FIGS. 1-3, the vehicle 10 includes a cargo bed extension system that is used to transition the cargo bed 18 between the standard position and the extended position.

The cargo bed extension system includes, in the exemplary embodiment, an inner tub 30, an outer tub 34, and a panel 38. The inner tub 30 is nested within the outer tub 34. The inner tub 30 can extend and retract relative to the outer tub 34 back-and-forth between the standard position of FIG. 5 and the extended position of FIGS. 7 and 9. The inner tub 30 is closer to the cab 14 of the vehicle 10 when the inner tub 30 is in the standard position than when the inner tub 30 is in the extended position. Latches can be used to hold the inner tub 30 in the standard position or the extended position.

The panel 38 is pivotably coupled to a forward end of the inner tub 30. The panel 38 is oriented vertically when the inner tub 30 is in the standard position. The panel 38 in the standard position is, in this example, received within a recessed area 40 provided within a front wall 42 of the outer tub 34.

Figure 9:
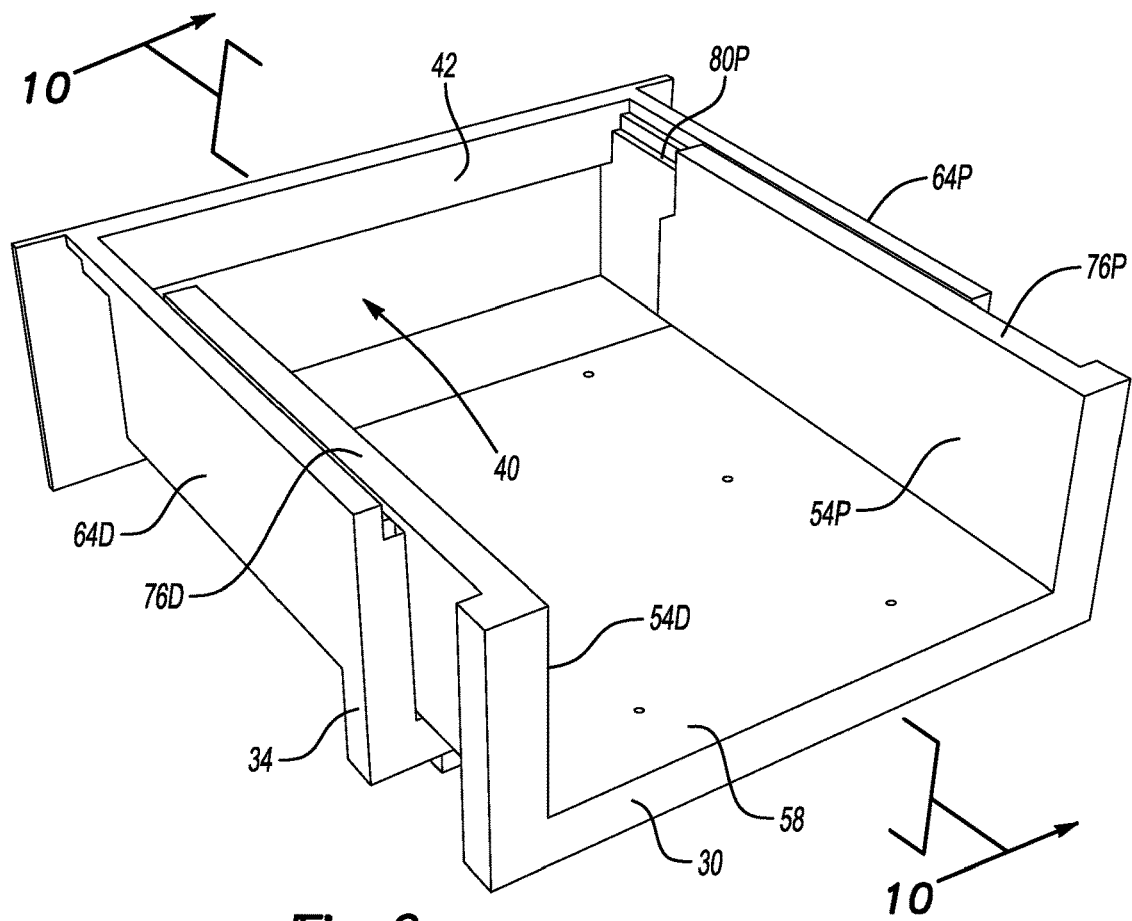
FIG. 9 illustrates the system of FIG. 4 when the inner tub is in the extended position and the panel is oriented horizontally.
Figure 10:
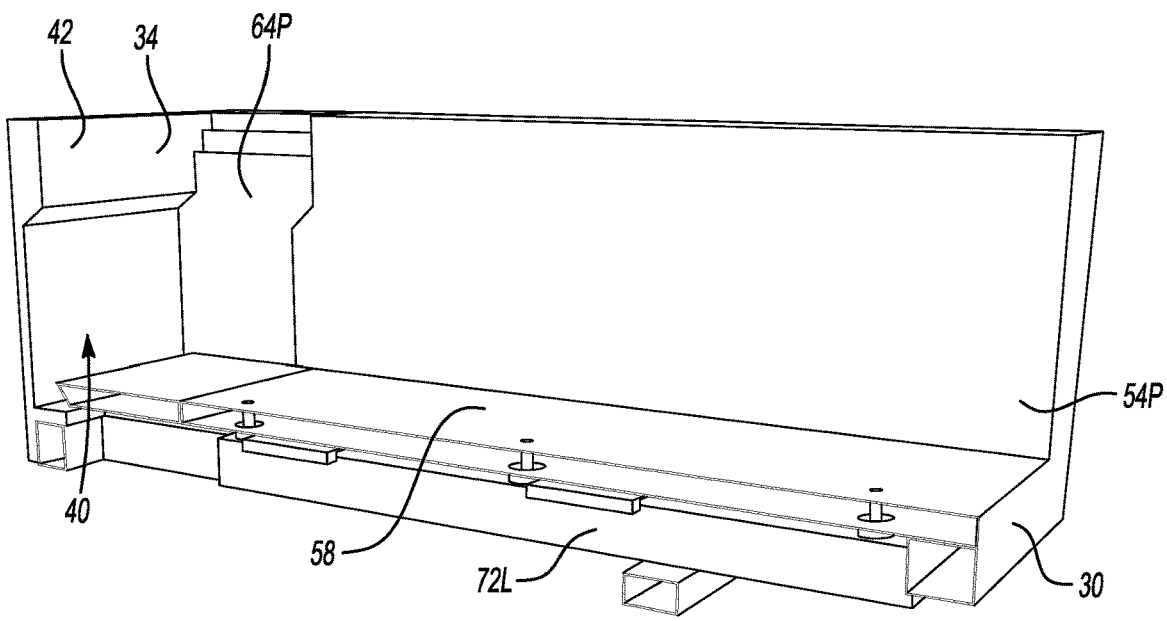
FIG. 10 illustrates a section view at line 10-10 in FIG. 9.

As the inner tub 30 slides to the extended position, or after sliding the inner tub 30 to the extended position, the panel 38 can pivot to a position where the panel 38 is oriented horizontally as shown in FIGS. 9 and 10. When the panel 38 is oriented horizontally, the panel 38 provides a floor section for the cargo bed 18 that is between the cab 14 and the inner tub 30. The panel 38 faces rearward when the inner tub 30 is in the standard position, and faces upward when the inner tub 30 is in the extended position.

When moving the inner tub 30 from the extended position back to the standard position, the panel 38 is rotated back to the vertical orientation. The panel 38 may slide along a ramp element to facilitate rotation back to the vertical orientation. In some examples, a user may actuate a latch device or actuator to initiate movement of the panel 38 back to the vertical orientation.

While the panel 38 in the exemplary embodiment is coupled to, and moves with, the inner tub 30, the panel 38 could instead be coupled to another structure, such as the front wall 42 of the outer tub 34. If coupled to the front wall 42, the panel 38 could rotate down from the front wall 42 to provide the floor section between the inner tub 30 and the cab 14.

Vertical and horizontal, for purposes of this disclosure, are with reference to ground and the general orientation of the vehicle 10 during operation. Forward and aft, for purposes of the disclosure, are also with reference to a general orientation of the vehicle 10.

A tailgate 46 is coupled to an aft end of the inner tub 30 and moves with the inner tub 30 as the inner tub 30 moves back-and-forth between the standard position and the extended position of FIGS. 9 and 10. The tailgate 46 can be pivotably coupled to the inner tub 30 and can move between the closed position of FIGS. 1 and 2 and the fully open position of FIG. 3.

The inner tub 30 includes a pair of inner tub sidewalls 54D and 54P, and an inner tub floor 58. The inner tub sidewalls 54D and 54P extend vertically upward from opposite sides of the inner tub floor 58.

The outer tub 34 includes opposing outer tub sidewalls 64D and 64P, and an outer tub floor 68. The outer tub sidewalls 64D and 64P extend vertically upward from opposite sides of the outer tub floor 68.

A plurality of rail assemblies 72 slidably couple the inner tub 30 to the outer tub 34. In this example, the rail assemblies 72 include upper rail assemblies 72U and lower rail assemblies 72L. The rail assemblies 72 can include tracks that are slidably received with one another and that slide relative to one another along a plurality of ball bearings.

One of the upper rail assemblies 72U is disposed vertically between a lip 76D of the inner tub sidewall 54D and a ledge 80D provided within the outer tub sidewall 64D. Another of the upper rail assemblies 72U is disposed vertically between a lip 76P of the inner tub sidewall 54P and a ledge 80P provided within the outer tub sidewall 64P.

The lip 76D is coupled to the upper rail assembly 72U on a driver side of the vehicle 10. The lip 76D extends laterally outward away from a centerline of the vehicle 10. Similarly, on the passenger side, the lip 76P is directly coupled to the upper rail assembly 72U on a passenger side of the vehicle 10. The lip 76P extends laterally outward away from a centerline of the vehicle 10.

The lower rail assembly 72L includes portions directly attached to the inner tub floor 58. Mechanical fasteners can be used, for example, to attach the lower rail assembly 72L to the inner tub floor 58.

In some examples, a user can manually move the inner tub 30 between the standard position and the extended position. In another example, an actuator could be incorporated into the vehicle 10 to, instead, or additionally, move the inner tub 30 back and forth between the extended position and the retracted position.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A cargo bed extension system, comprising:
    a tub of a cargo bed, the tub configured to transition back-and-forth between a standard position and an extended position, the tub closer to a cab of a vehicle when the tub is in the standard position than when the tub is in the extended position;
    a panel that is oriented vertically when the tub is in the standard position and is oriented horizontally when the tub is in the extended position, the panel providing a floor section between the cab and the tub when the tub is in the extended position,
    wherein the tub includes a tub floor, a first tub sidewall, and a second tub sidewall, the first and second tub sidewalls extending vertically upward from opposite sides of the tub floor; and
    a driver side upper rail assembly and a passenger side upper rail assembly, the first tub sidewall including a lip coupled to the driver side upper rail assembly, the second tub sidewall including a lip coupled to the passenger side upper rail assembly,
    wherein the tub is an inner tub, and further comprising an outer tub having an outer tub floor, an outer tub passenger sidewall, and an outer tub driver sidewall, wherein the inner tub is nested within the outer tub,
    wherein the driver side upper rail assembly slidably couples the lip of the first tub sidewall to the outer tub driver sidewall, wherein the passenger side upper rail assembly slidably couples the lip of the second tub sidewall to the outer tub passenger sidewall,
    wherein the driver side upper rail assembly is disposed vertically between the lip of the first tub sidewall and a ledge of the outer tub driver sidewall, wherein the passenger side upper rail assembly is disposed vertically between the lip of the second tub sidewall and a ledge of the outer tub passenger sidewall.

2. The cargo bed extension system of claim 1, wherein the panel faces rearward when the tub is in the standard position, wherein the panel faces upward when the tub is in the extended position.

3. The cargo bed extension system of claim 1, wherein the panel is pivotably coupled to a forward end of the tub.

4. The cargo bed extension system of claim 3, further comprising a tailgate pivotably coupled to an aft end of the tub, the tailgate moving with the tub between the standard position and the extended position.

5. The cargo bed extension system of claim 1, wherein the lip of the first tub sidewall and the lip of the second tub sidewall each extend laterally outward away from a centerline of the vehicle.

6. The cargo bed extension system of claim 1, wherein the tub is an inner tub, and further comprising an outer tub having an outer tub floor, an outer tub passenger sidewall, and an outer tub driver sidewall, wherein the inner tub is nested within the outer tub.

7. The cargo bed extension system of claim 6, wherein the driver side upper rail assembly slidably couples the lip of the first tub sidewall to the outer tub driver sidewall, wherein the passenger side upper rail assembly slidably couples the lip of the second tub sidewall to the outer tub passenger sidewall.

8. The cargo bed extension system of claim 7, further comprising at least one lower rail assembly that couples the tub floor of the inner tub to the outer tub floor of the outer tub.

9. The cargo bed extension system of claim 1, wherein the panel is received within a recessed area when the panel is vertically and the tub is in the standard position.

10. A cargo bed extension method, comprising:
    extending an inner tub relative to an outer tub to extend a cargo bed of a vehicle, the inner tub nested within the outer tub, the inner tub including inner tub sidewalls that are slidably coupled directly to respective outer tub sidewalls of the outer tub through an upper rail assembly,
    wherein each upper rail assembly slidably couples a lip of a first tub sidewall to a respective one of the outer tub driver sidewalls,
    wherein each upper rail assembly is disposed vertically between the respective lip of the first tub sidewall and a ledge of the outer tub driver sidewall.

11. The cargo bed extension method of claim 10, further comprising lowering a panel to provide a floor section between a floor of the inner tub and a cab of the vehicle.

12. The cargo bed extension method of claim 11, wherein the lowering is during the extending.

13. The cargo bed extension method of claim 12, wherein the panel is pivotably coupled to the inner tub.

14. The cargo bed extension method of claim 11, wherein the panel is received within a recessed area provided in a front wall of the outer tub when the inner tub is not extended relative to the outer tub.

\* \* \* \* \*